(12) United States Patent
Kinzenbaw

(10) Patent No.: US 8,167,527 B2
(45) Date of Patent: May 1, 2012

(54) AUGER WAGON WITH FOLDING LIFT AUGER AND RETRACTING DELIVERY HOOD

(75) Inventor: Jon E. Kinzenbaw, Williamsburg, IA (US)

(73) Assignee: Kinze Manufacturing, Inc., Williamsburg, IA (US)

(*) Notice: Subject to any disclaimer, the term of this patent is extended or adjusted under 35 U.S.C. 154(b) by 228 days.

(21) Appl. No.: 12/261,673

(22) Filed: Oct. 30, 2008

(65) Prior Publication Data

US 2009/0110526 A1    Apr. 30, 2009

Related U.S. Application Data

(60) Provisional application No. 60/983,962, filed on Oct. 31, 2007.

(51) Int. Cl.
*B60P 1/00* (2006.01)
(52) U.S. Cl. ........................... 414/523; 414/526
(58) Field of Classification Search .............. 414/345, 414/523, 502, 526
See application file for complete search history.

(56) References Cited

U.S. PATENT DOCUMENTS

| | | | | |
|---|---|---|---|---|
| 2,845,167 A | * | 7/1958 | Heiken | 198/660 |
| 2,883,076 A | * | 4/1959 | Palmer | 414/526 |
| 3,107,825 A | * | 10/1963 | Reed | 222/310 |
| 4,274,790 A | * | 6/1981 | Barker | 414/502 |
| 4,356,910 A | * | 11/1982 | Togstad | 198/660 |
| 4,443,149 A | * | 4/1984 | Isaacson | 414/326 |
| 4,506,904 A | | 3/1985 | Kinzenbaw | |
| 4,526,235 A | | 7/1985 | Kinzenbaw | |
| 4,552,375 A | | 11/1985 | Kinzenbaw | |
| 4,648,334 A | | 3/1987 | Kinzenbaw | |
| 4,923,017 A | | 5/1990 | Meek et al. | |
| 4,986,367 A | | 1/1991 | Kinzenbaw | |
| 5,024,173 A | | 6/1991 | Deckler | |
| 5,058,766 A | | 10/1991 | Deckler | |
| 5,108,249 A | | 4/1992 | Kinzenbaw et al. | |
| 5,139,314 A | | 8/1992 | Deckler | |
| 5,340,265 A | * | 8/1994 | Grieshop | 414/526 |
| 5,346,019 A | | 9/1994 | Kinzenbaw et al. | |

(Continued)

*Primary Examiner* — Saul J. Rodriguez
*Assistant Examiner* — Glenn Myers
(74) *Attorney, Agent, or Firm* — Edwards Wildman Palmer LLP

(57) ABSTRACT

An agricultural auger wagon includes a horizontal floor auger and a forward lift auger for delivering grain to a transport vehicle. The lift auger is a folding auger which includes a fixed lower auger section and an upper auger section mounted above the lower auger section in use. The upper auger section is moved by an hydraulic cylinder between the upright delivery position for delivering the contents of the wagon to an adjacent transport vehicle, such as a truck, and a folded transport position. The folding upper auger section has a retractable delivery hood. In the use or delivery position, the upper and lower left auger sections are aligned for delivering product. During the movement of the upper auger section to the delivery position, the delivery hood is moved by linkage to the distal upper end of the upper auger section for maximum height and reach in delivering grain to an adjacent vehicle. To place the lift auger assembly in the transport position, an hydraulic cylinder pivots the upper auger section from the raised, delivery position to a horizontal transport position in which the upper, moveable auger section lies immediately in front of the wagon in a generally horizontal disposition with its axis extending transverse of the direction of travel. A linkage is actuated by the folding action of the upper auger section to move the delivery hood along the upper auger housing to reduce the overall length of the upper auger section in transport while increasing its reach in the delivery position.

9 Claims, 9 Drawing Sheets

U.S. PATENT DOCUMENTS

| | | |
|---|---|---|
| 5,488,996 A | 2/1996 | Barry et al. |
| 5,632,212 A | 5/1997 | Barry |
| 5,647,440 A | 7/1997 | Barry et al. |
| 5,655,872 A * | 8/1997 | Plotkin .................. 414/526 |
| 5,697,455 A | 12/1997 | Deckler |
| 5,740,870 A | 4/1998 | Rodgers et al. |
| 6,148,747 A | 11/2000 | Deckler et al. |
| 6,261,050 B1 * | 7/2001 | Kuhns .................. 414/526 |
| 6,325,156 B1 | 12/2001 | Barry |
| 6,494,154 B2 | 12/2002 | Kinzenbaw et al. |
| 6,497,546 B2 | 12/2002 | Wood et al. |
| 6,581,535 B2 | 6/2003 | Barry et al. |
| 6,767,174 B2 * | 7/2004 | Cresswell .................. 414/523 |
| 6,971,324 B1 * | 12/2005 | Beck .................. 111/200 |
| 7,093,548 B2 | 8/2006 | Eben et al. |
| 7,152,542 B2 | 12/2006 | Eben et al. |
| 7,198,337 B2 | 4/2007 | Deckler et al. |
| 7,381,131 B1 * | 6/2008 | Harpole .................. 460/114 |
| 2004/0184905 A1 * | 9/2004 | Kinzenbaw et al. .......... 414/526 |

* cited by examiner

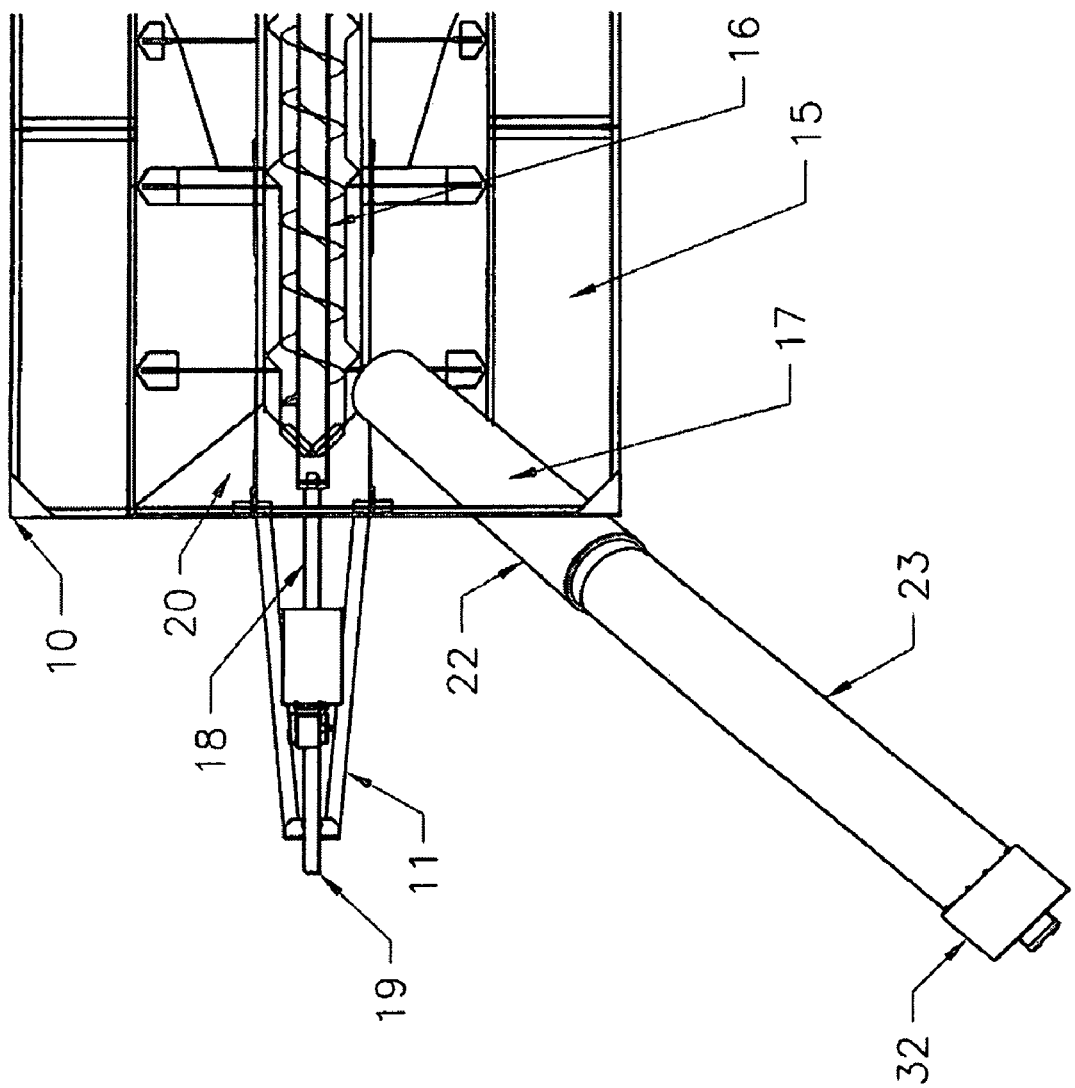

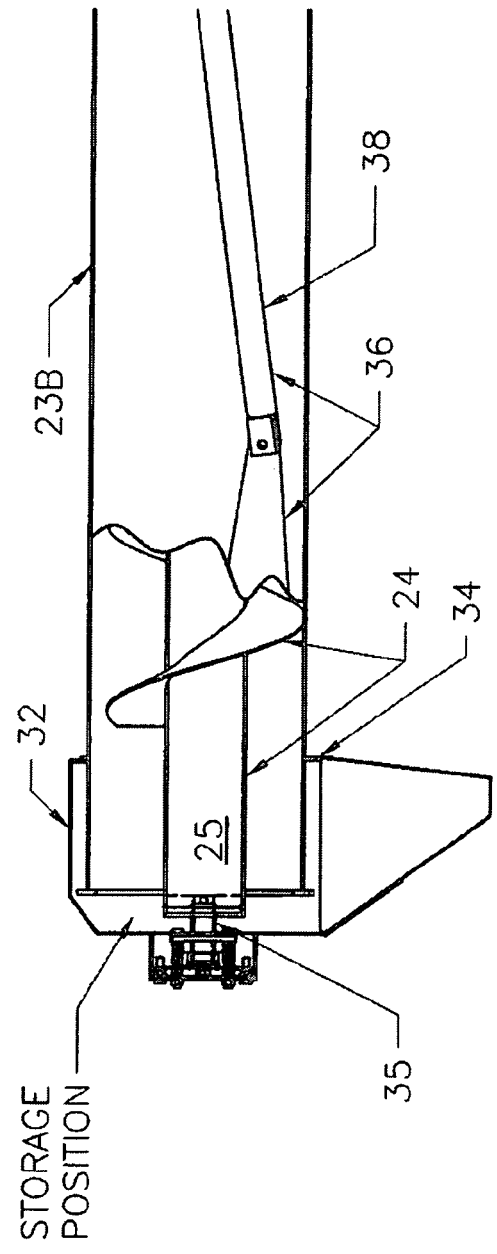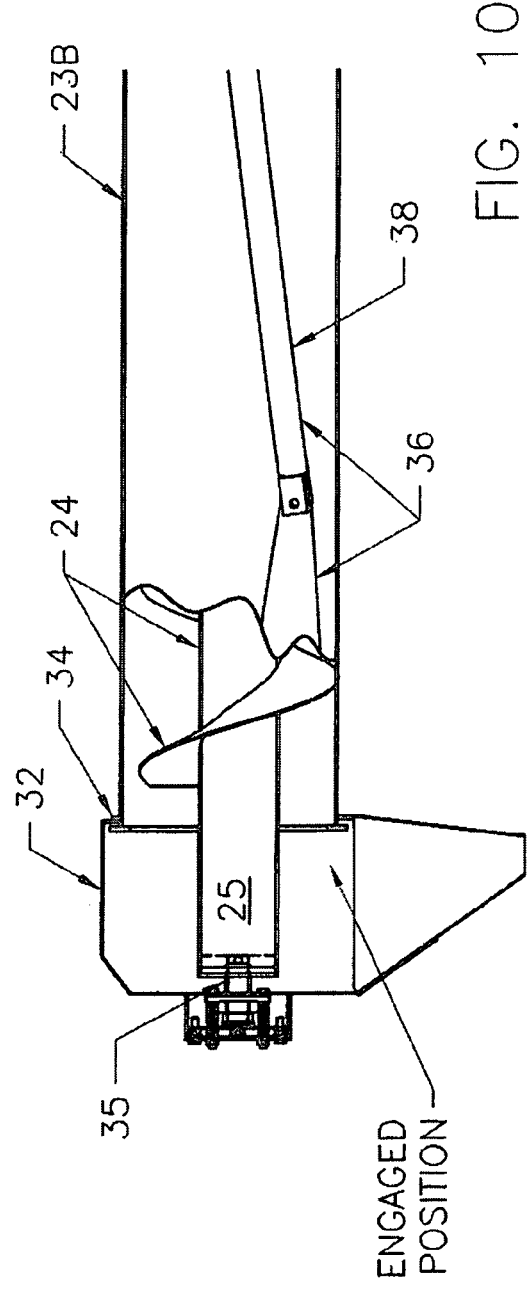

AUGER WAGON WITH FOLDING LIFT AUGER AND RETRACTING DELIVERY HOOD

RELATED APPLICATION

This is a Non-Provisional Application of co-owned provisional application No. 60/983,962, for "Auger Wagon with Folding Lift Auger and Retractable Delivery Hood" filed Oct. 31, 2007.

FIELD OF THE INVENTION

The present invention relates to the agricultural auger wagon for use in harvesting agricultural products such as corn, beans or other crop (collectively "grain"). In particular, the invention relates to a large auger wagon which may be pulled by a tractor alongside a combine to receive recovered product directly from the combine as it is processed. The wagon may simultaneously and continuously deliver product to an adjacent transport vehicle, such as a truck, traveling alongside the auger wagon. Typically, wagons of this type are large, and include a floor auger inside the bin for conveying the grain to the front of the wagon where the grain is gathered by a lift auger which transfers the grain to the adjacent transport vehicle. The lift auger may be extended for delivery of grain and folded for road or field transport. Thus, wagons of this type are frequently referred to as auger wagons.

An auger wagon with a foldable lift auger preferably has adequate reach to the side and sufficient height to allow delivery into a receiving vehicle with sufficient safety clearance between vehicles. A limiting factor to this range of lateral reach and height is that in the folded or transport position, the horizontal length of the folded auger section must be limited so it does not substantially increase the transport width of the wagon.

Transport width is limited by practical considerations such as being able to pass through gates, and the need to prevent collisions with roadside obstacles such as road signs and bridge structures. It can also be limited by legal restrictions on the maximum width an implement can have for road travel in a jurisdiction. Implements with too great a transport width can also present problems for the user by limiting the turning radius of the machine or by making it impossible or risky to pass the machine through a doorway into a machine shed or repair shop.

This conflict (i.e. transport width versus capacity, turning radius, safety and lateral reach for transferring the grain) is increased in implement designs where the fixed auger section of the lift auger is placed at a diagonal, corner disposition on the cart (commonly referred to as a "corner auger wagon") so that the discharge point is brought forward of the wagon bin at a compound angle (i.e. the auger extends upwardly and laterally of the wagon). In this type of design, part of the increase in lateral reach is lost by rotating the lift auger assembly forward about a vertical axis to position the discharge end of the unload auger forward and more alongside the tractor operator, to improve operator visibility of the unload process. Rotating the position of the lift auger forward (for operator surveillance) reduces the amount of lateral reach that can be achieved (for the same length of lift auger) in order to position the discharge of grain into the adjacent receiving vehicle, while maintaining safe separation distances.

Many different approaches have been used on grain carts to address the competing desires to extend the reach and height required during delivery verses limits on width in transport. Some designs position the upper auger along the side of the auger wagon bin in the direction of travel when it is folded. This may not be the best choice for the operator because the folding action of the auger can cause it to collide with adjacent vehicles which may be out of the operator's view as the auger folds behind him.

Other designs have used a folding method that rotates the upper auger assembly in front of the wagon and further over to the right side to reduce overhanging of the folded conveyor. This can create problems in the field and when making sharp turns because the discharge head of the upper auger is at a height that can cause it to come into contact with the tractor tires during sharp turns which can lead to both tire damage and damage to the upper auger structure. A further disadvantage of this design is that the folding geometry used to create additional degrees of folding rotation in the upper auger section reduces the mechanical advantage in the maximum folded position. This results in the need for heavier folding linkages and larger hydraulic cylinders for folding. This approach can also be more costly to produce and is more prone to wear and failure.

Other methods and structures have been designed to accommodate the need for extended unloading reach without an excessive amount of lateral overhang in the folded position, such as variable angle discharge spouts and rotatable vertical auger housing assemblies, but none of these designs address the issue of obtaining maximum lateral and forward reach and sufficient height for the discharge point, while maintaining minimum transport width (in the folded position) and operator visibility in use, while at the same time, making the transition from a field use position to a storage or transport position as safe and automatic as possible for the operator.

The present invention addresses these issues.

SUMMARY

The present invention is directed to an auger wagon having a lift auger assembly which includes a lower auger section fixed to a forward corner of the bin of the wagon or cart, and an upper auger section moveable (foldable) between a raised delivery position and a folded transport position. The folding upper auger section may preferably be positioned transverse to the direction of travel in the folded or transport position.

A delivery hood is a box-like structure which is mounted to the upper end of a round upper auger delivery tube. The delivery hood of the present invention is mounted to the outer auger tube of the upper auger section in a manner which allows the delivery hood to slide along and rotate about the outer auger housing or tube. The top of the upper auger flighting assembly is mounted to the delivery hood and moves axially within its housing during the folding sequence so that the delivery hood is moved toward the center of the wagon relative to its associated auger housing during folding, thereby minimizing any overhang of the delivery hood in the transport position. This arrangement enables the delivery hood to be mounted external to the grain flow so there are no restrictions to the flow of grain during delivery, and the hood is less likely to be damaged by the flow of the grain. This also allows the delivery hood to slide axially along the length of the cylindrical upper auger housing and to rotate as necessary during folding and unfolding. The delivery hood is positioned properly by a control linkage during folding and unfolding.

A control linkage comprising two link assemblies extends between the delivery hood and a pivot adjacent to the base of the rotatable upper auger section. The control linkage causes the delivery hood to slide axially lengthwise of the upper auger housing as the auger assembly is folded from a field use position to a storage or transport position. The control linkage causes the delivery hood and upper auger flighting to slide axially upward along the upper auger housing as the upper auger section is folded into a field use position, and downwardly to a collapsed position as the upper auger section is folded to the transport position. This displacement of the upper delivery hood (and corresponding translation of the upper auger flighting within the upper auger housing) effectively and automatically foreshortens the axial length of the upper auger section in the transport position, while increasing discharge height and lateral reach in the delivery position when the upper auger section is moved by the control linkage to the delivery position. Thus, the effective lateral extension of the upper auger section can be limited to the width of the wagon when the upper auger assembly is in the folded transport position and increased automatically when placed in the delivery or use position.

The result is that the lower end of the upper auger flighting is translated out of the lower end of the auger housing upon folding, and it lies above the lower, fixed auger section as the assembly is folded to a transport position. This places the lower portion of the upper auger flighting, which is translated out of the upper auger tube during folding, over the top of the lower auger section during transport. This space above the lower auger section (when the upper auger section is folded to transport) has not been put to useful advantage in previous designs when the auger is placed in the transport position. The amount of movement of the delivery hood and upper auger flighting is determined by the height of the hood and the geometry of the connecting linkage. In one configuration the range of movement of the delivery hood may be approximately seventeen inches. In other words, seventeen inches of additional auger height and reach are gained in the use position, without any associated increase in transport width when the upper auger section is folded for transport.

BRIEF DESCRIPTION OF THE DRAWING

FIG. 8 is a fragmentary top view of the forward portion of the auger wagon with the vertical auger in the delivery position;

FIG. 9 is a fragmentary vertical cross section view of the upper part of the upper auger tube in the transport position with the outer tube partially cut away to show the mounting of the delivery hood on the housing of the upper auger section; and FIG. 10 is a view similar to FIG. 9 with the delivery hood in the use or delivery position.

DETAILED DESCRIPTION

Figure 1:
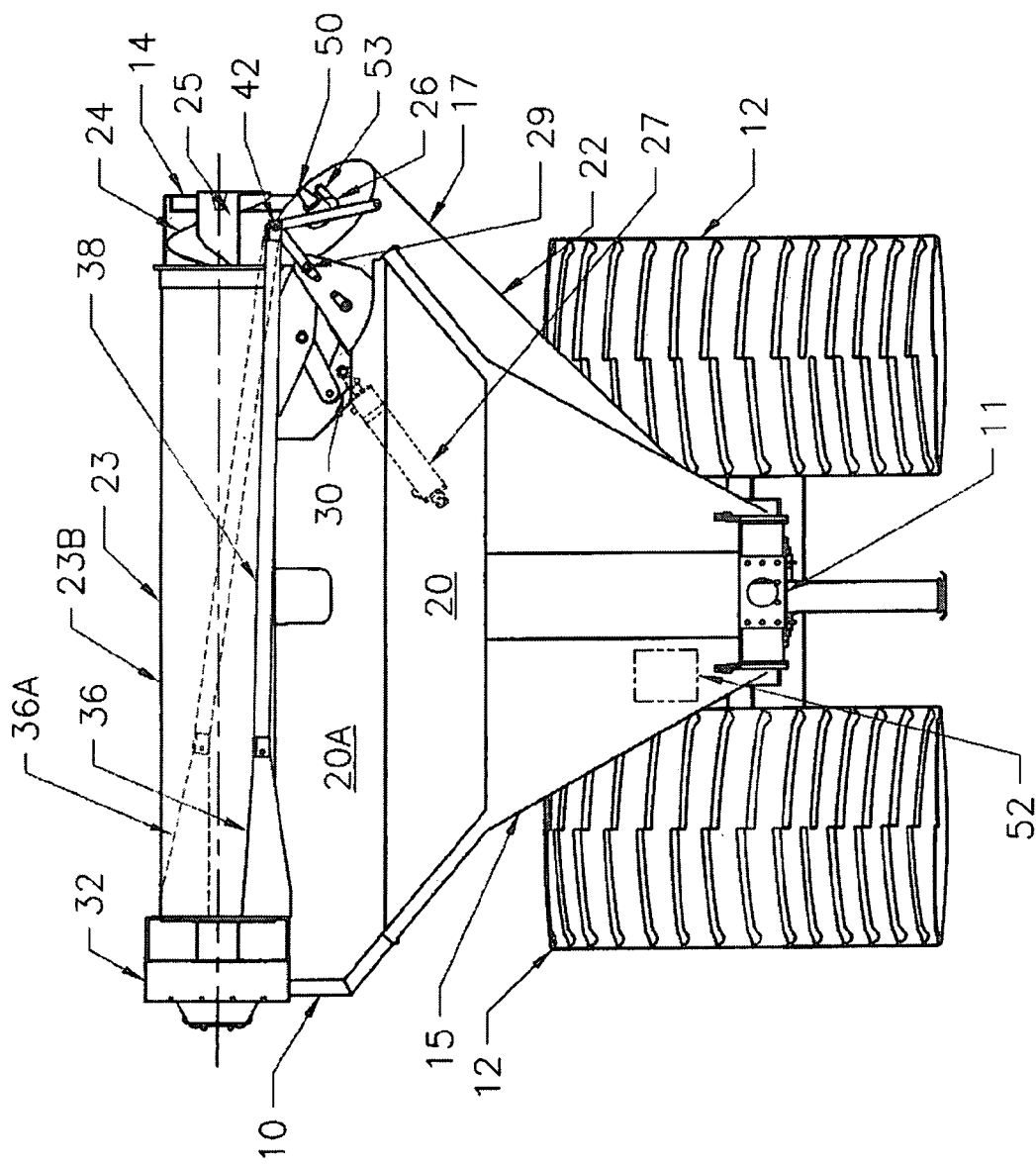
FIG. 1 is a front elevation view of an agricultural auger wagon incorporating the present invention in the transport position with the delivery hood moved axially along the upper auger housing of the unload or vertical auger, toward the center of the wagon.

Turning first to FIG. 1, there is shown an auger wagon generally designated 10 and including a frame 11 and ground support wheels 12. The storage bin 10 has front, rear and left and right sidewalls, the left sidewall in FIG. 1 being designated 14. As is custom in agricultural equipment, "left" and "right" refer to the side of a machine or implement with the observer looking in the forward direction of travel. Thus, in FIG. 1, the right side of the wagon is the side contacted by the arrowhead associated with reference numeral 10—i.e. on the left in the drawing.

In large auger wagons of the type shown in FIG. 1, it is conventional to have the upper-portions of the sidewalls extend generally vertically, with the lower portions of all four sidewalls being tapered inwardly toward a flat bottom wall. See for example, the tapered lower sidewall portion 15 which not only narrows the overall width of the wagon by allowing the tires 12 to be mounted closer to the center, but inclined lower walls also act to funnel grain within the bin 10 towards a floor auger 16 (FIG. 7) which extends substantially the entire length of the bottom of the bin 10 and moves grain from the back to the front of the wagon (the "transfer location") where it is gathered by a lift or vertical auger generally designated 13 in FIG. 6 and fed to a delivery hood 32 (seen in the delivery position in FIG. 6).

Figure 3:
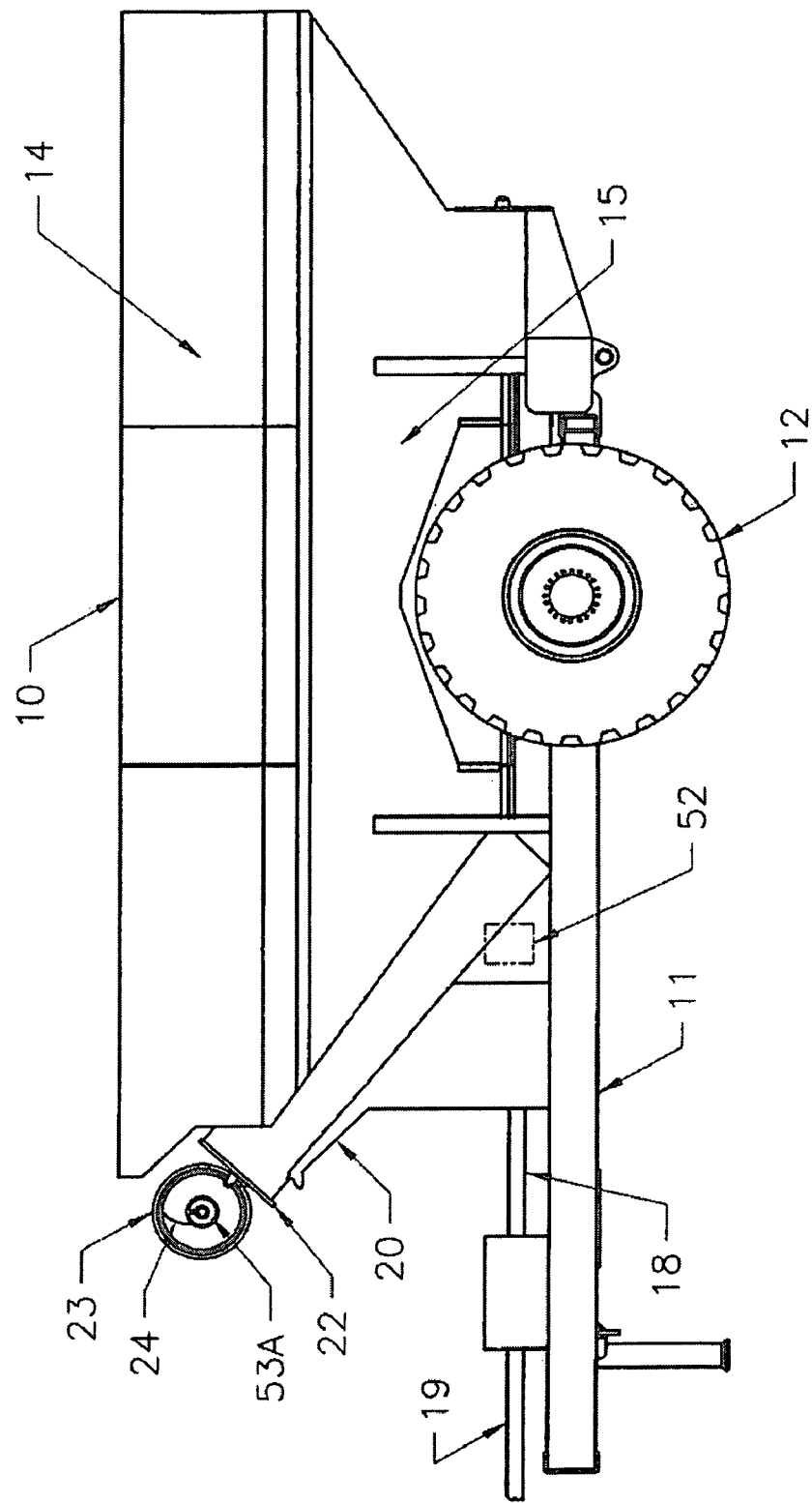
FIG. 3 is a left side elevation view of the auger wagon of FIG. 1 with the lift auger in the transport position.

The floor auger 16 is driven by a shaft designated 18 (FIG. 3) which, in turn, is driven by the power takeoff of the tractor, shown generally at 19. The lower portion of the forward wall of the bin 10, shown at 20 in FIGS. 1 and 7, 20A (FIG. 7) is also inclined downwardly and rearwardly. The lower portion of the rear wall is similarly inclined toward the front of the wagon. The inclination of the lower portions of the forward and rear walls not only funnel grain inwardly toward the floor auger (which runs the length of the bottom), but it reduces the overall length of the floor auger, and thereby reduces cost. The floor auger 16, as is known, feeds grain from the bottom of the bin 10 toward a transfer area at the front of the floor auger from which the lift auger takes the grain at the forward, bottom area of the bin 10 and lifts it for delivery to a transport vehicle such as a truck which, during harvest, is located to the left side of the auger wagon and tractor combination which, in turn, may be located on the left side of a combine harvesting the grain and transferring the harvested grain directly into the bin 10 of the auger wagon.

Turning now to the lift auger (sometimes referred to as the "vertical" or "delivery" auger) in particular, it includes a lower auger section 22 and an upper auger section 23. Each of the auger sections 22, 23 includes a cylindrical or tubular outer wall (sometimes referred to as a "housing") and a section of auger flighting mounted to an inner, central drive tube. For example, the auger flighting for the upper auger section 23 in FIG. 1 is designated 24, and the auger flighting for the lower auger section 22 is designated 26 in FIG. 1. The flighting of each auger section 22, 23 is mounted on an associated center tube, designated 25 for the upper auger section 23 in FIG. 1.

Figure 6:
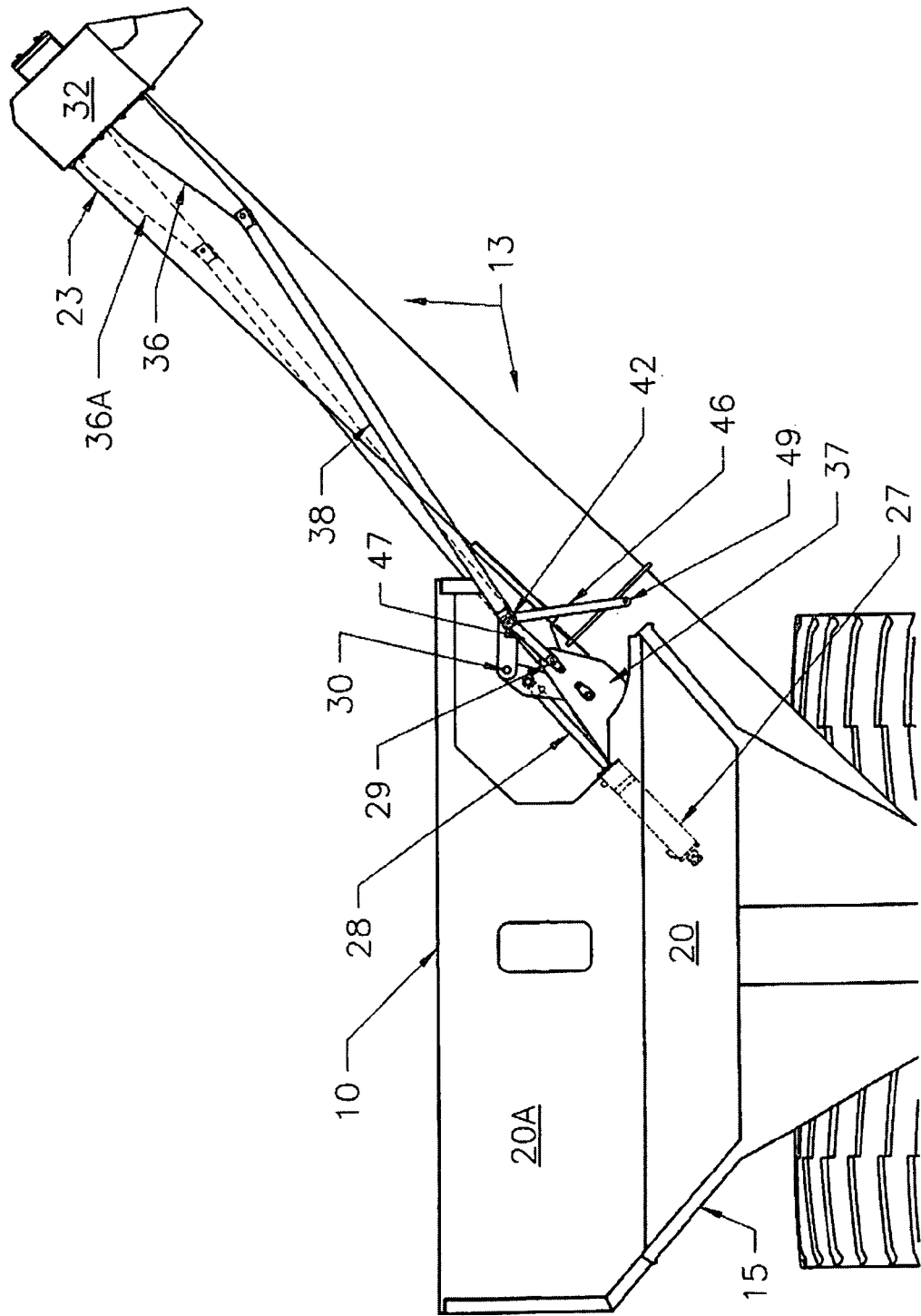
FIG. 6 is a fragmentary front view of the wagon similar to FIG. 5 with the lift auger fully extended for transferring grain to an adjacent vehicle.
Figure 7:
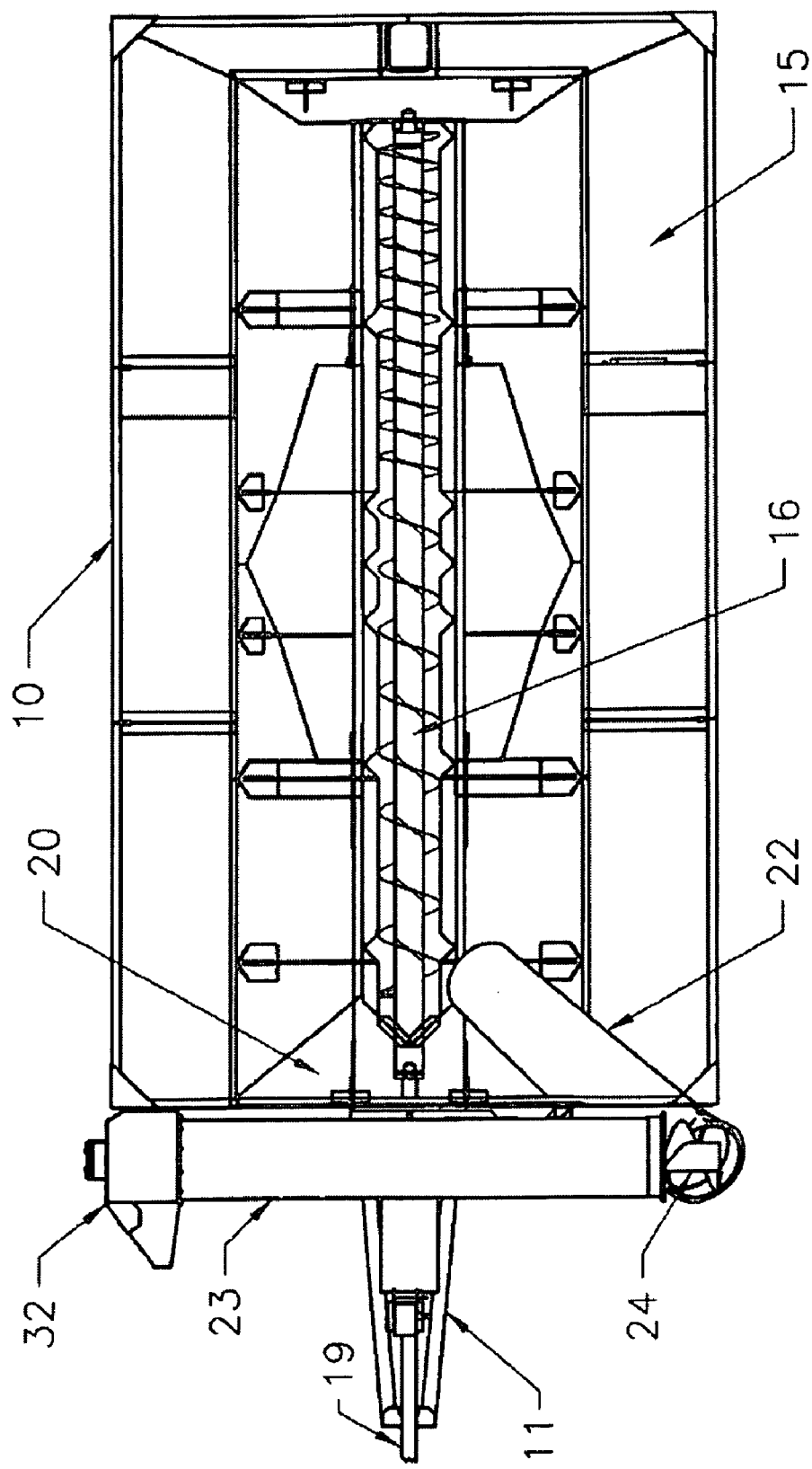
FIG. 7 is a top view of the auger wagon with the vertical auger in the transport position.

The housing 17 of the lower auger section 22 is mounted integrally with and extend through the front wall 20 of the bin. That is, the lower portion of the lower auger section 22 extends into the interior of the bin 10 at a location near the left front corner and couples to an area located at the forward end of the floor auger where grain is picked up by the inboard or lower input end of the lower auger section 22 of the lift auger 24 when the lift auger is assembled in the delivery position (FIGS. 6 and 8). In the view of FIG. 1, the lift auger is in the transport position, as will be further described within.

Turning now to FIG. 6 (in which the lift auger 13 is in the delivery position), the upper auger section 23 has been raised by an hydraulic cylinder 27 the rod of which is designated 28 in FIG. 6, to the delivery position. A linkage generally designated 30 driven by the hydraulic cylinder 27 in FIG. 6 moves the upper auger section 23 between the transport position (FIG. 1) and the delivery position of FIG. 6. In FIGS. 1, 2, 5 and 6, a portion of the upper, vertical front wall 20A is open to view the linkage 30 and cylinder rod 28, the hydraulic cylinder 27 is behind the front wall 20 and shown in phantom. This linkage lies in front of a vertical panel so it is separated from the contents of the bin.

Figure 2:
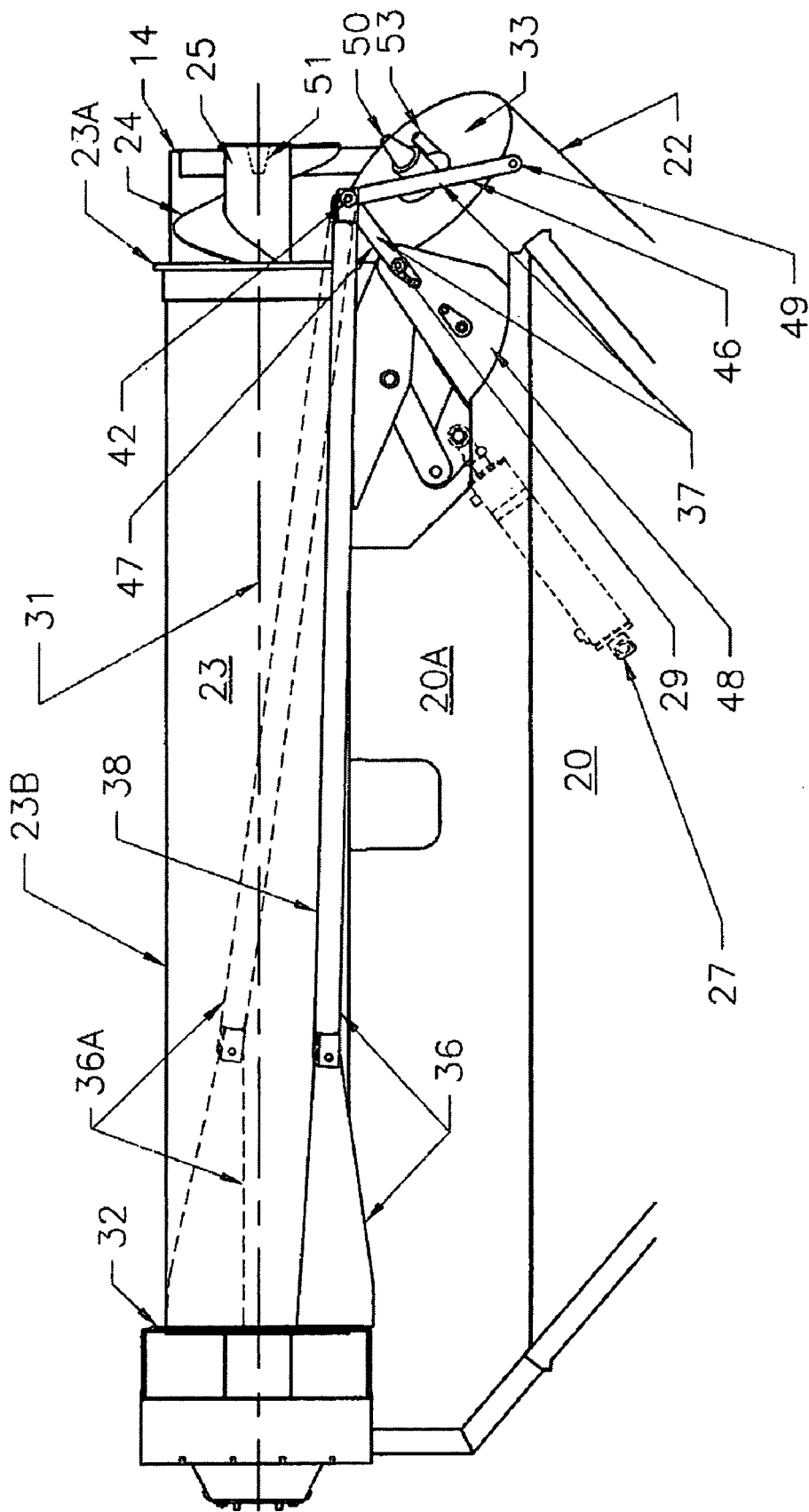
FIG. 2 is a fragmentary close-up view of the upper auger section in the folded or transport position.

FIG. 2 is a view taken from a position similar to that of FIG. 1, but closer to the wagon so as to present more detail. At the top of the upper auger section 23 (that is to the left as seen in FIG. 2), there is a delivery hood 32 mounted to the top of the center tube 25 of the upper auger housing 23B by a lock collar 35 (FIGS. 9, 10). The delivery hood 32 is shown in the delivery position in FIGS. 6 and 8 (also, compare FIGS. 9 and 10). The delivery hood 32 is slidably received on the upper end of the housing or outer housing 23B of the upper auger section 23, and this mounting includes a bearing ring 34 (seen in FIGS. 9 and 10) fixed to the delivery hood 32 portion of the upper auger section 23 for permitting the hood 32 to slide axially on the exterior of the housing 23B of the upper auger section 23.

Figure 5:
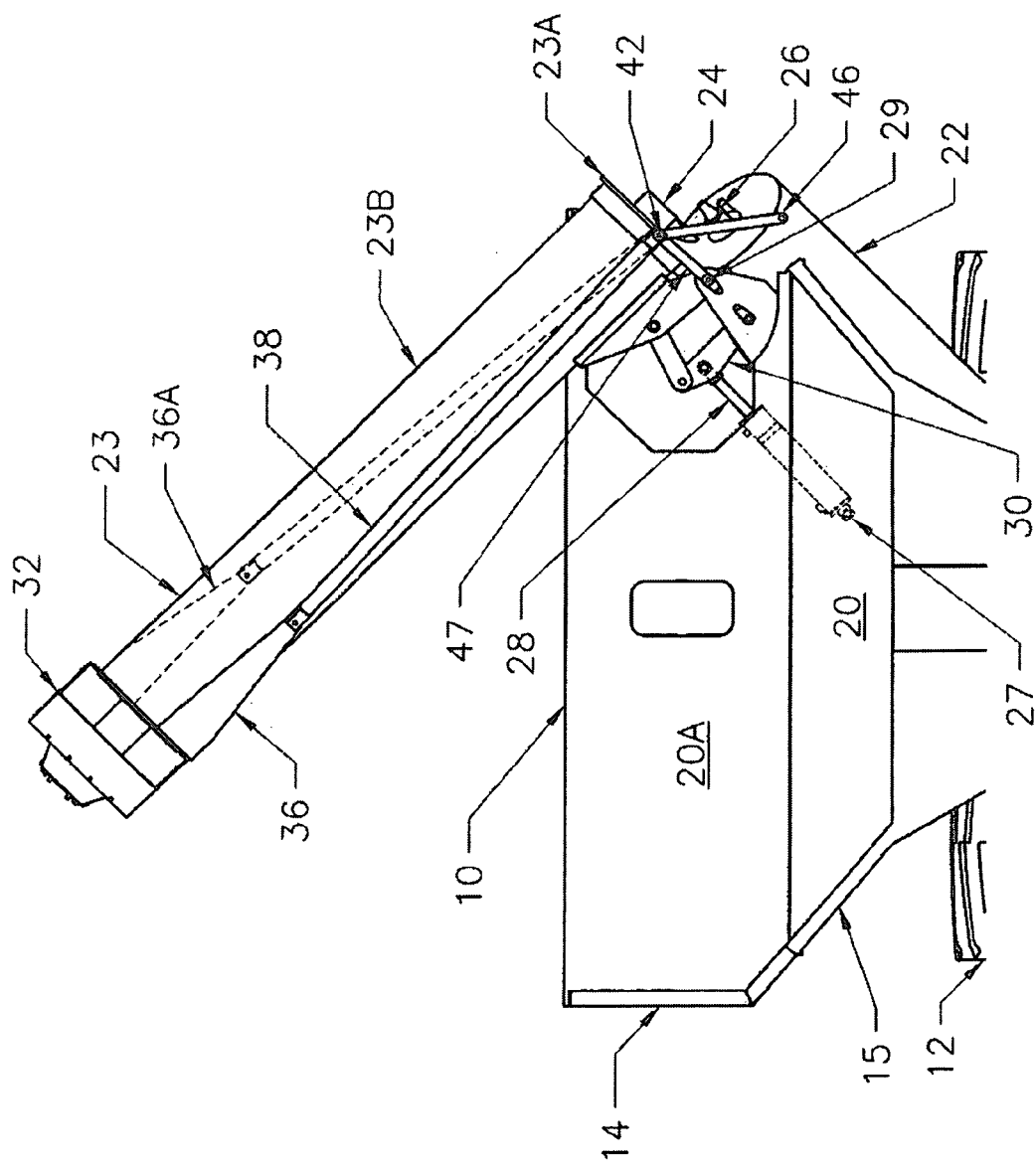
FIG. 5 is a fragmentary front elevation view similar to FIG. 4 with the upper auger section raised further toward the delivery position than in FIG. 4.

A linkage assembly 36 is mounted to the base of the hood 32 and includes a rod 38 connected to a pivot 42 (FIGS. 2 and 5). The pivot 42 is located and supported by means of a link assembly 37, to be described further below. A corresponding linkage 36A is provided on the opposing side of the upper auger section 23, seen in FIG. 2, but hidden from view in FIGS. 1, 5 and 6. Each of the link assemblies 36, 36A (together sometimes referred to as a "control linkage") operate in the same manner, so that a further explanation of the linkage assembly 36, and particularly the locating or base linkage associated with the pivot 42, will be sufficient, for those skilled in the art to understand the structure and operation of the linkage assemblies 36, 36B.

Still referring to FIG. 2, the linkage assembly 37 associated with the pivot point 42 includes a first link 46 and a second link 47. The base end of the link 46 is mounted by a bolt 49 to the fixed tube of the lower auger section, and the bottom of the link 47 is mounted to the front wall of the bin by means of a flange or bracket 48. A corresponding pivot for linkage 36A is fixed to the wagon.

It will be observed from FIG. 2 that the bottom 23A of the housing 23B of the upper auger section 23 has been moved to the left in FIG. 2 (toward the right side of the wagon) and away from the upper opening 33 of the housing of the fixed lower auger section 22. The link 36 has a fixed length and fixed hinge or pivot points. Thus, the distance of the delivery hood 32 from the pivot 42 is the same in the transport and delivery configurations. However, when placing the vertical auger in the transport position, the upper auger housing 23B moves to the left from the delivery position, as seen in FIG. 2. Thus, when hydraulic cylinder 27 moves the upper auger section 23 to the transport position, the links 36, 36A maintain the delivery hood 32 at a fixed distance from their respective pivots, and the upper auger housing 23B is translated to the left as seen in FIG. 2. The links 36, 36A force the auger housing 23B to slide within the delivery hood 32 because of the action of the hydraulic cylinder 27 and the lift linkage, when actuated, as will be described further below.

In summary, the control links 36, 36A restrain movement of the discharge hood 32 away from pivot 42 while the outer auger housing 23B is moved to the left as viewed in FIG. 2, thus sliding the housing 23B within the delivery hood 32 when the upper auger section is moved from the delivery position (FIG. 10) to the transport position (FIG. 9).

Another way to view this is to observe that the top of the auger flighting assembly 24 (which includes the center tube 25) is slid within its upper auger housing 23B during the transition from the delivery position to the transport position so that a portion of the auger flighting extends beyond the bottom 23A of the auger housing 23B in the transportation position, as seen in FIG. 2, whereas in the delivery position, the bottom of the flighting 24 is aligned with the bottom 23A of the outer housing 23. Thus, the distance by which the top of the delivery hood 32 extends beyond the right (left in FIG. 1) wall of the wagon is substantially reduced while the lower end of the upper auger section, when translated axially within the upper auger housing 23B, projects only a very short distance (if at all, depending on design) beyond the upper left wall 14 (right side in FIG. 2) of the wagon.

The movement of the flighting 24 of the upper auger section is a function of the position of the upper auger section as it is rotated from the transport position (FIGS. 2, 9) to the use or delivery position (FIGS. 6, 10). This is illustrated progressively and in sequence, in FIGS. 2, 4, 5 and 6. In this sequence, the flighting assembly 24 of the upper auger section is seen to move progressively beyond the lower edge 23A of the upper auger housing 23B of the upper auger section 23, and the delivery hood 32 is progressively translated toward the distal end of, the housing of the upper auger section as the upper auger section is rotated from the horizontal transport position of FIG. 2, to a position raised about 30 degrees (FIG. 4), to the position shown in FIG. 5 where it is raised approximately 50 degrees. The two auger flighting sections then engage (in a manner which is commonly known) when the upper auger section is fully rotated to the delivery position of FIG. 5 and the hood 32 is located in the delivery position.

Figure 4:
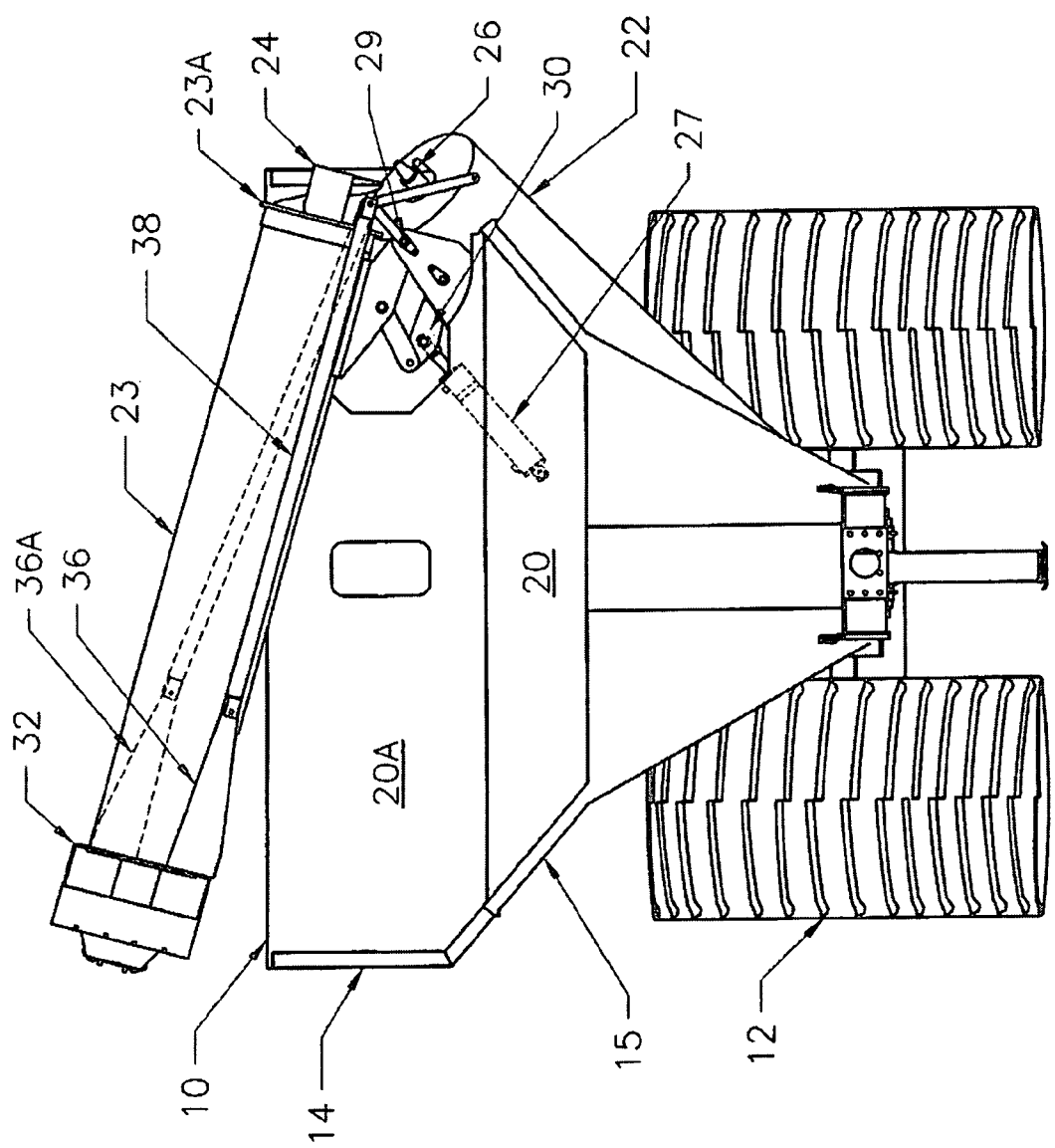
FIG. 4 is a view similar to FIG. 1 wherein the upper auger section has been actuated (clockwise) to partially raise it toward the use or delivery position.

The reverse can be seen to be true by reversing the sequence of figures, from FIG. 5, to FIG. 6, then FIG. 5 and then FIG. 4. That is, in FIG. 6, the two auger flighting sections are aligned with the upper and lower auger sections aligned in the use position. In the use position, the auger flighting 24 of the upper auger section 23 is housed entirely within the housing 23B of the upper auger section. In moving from the delivery position of FIG. 5 to the intermediate position of FIG. 4, it can be seen that the auger flighting 24 has moved a short distance out of the housing 23B of the upper auger section 23 (but none of the flighting can be seen), and then in FIG. 2, the outer housing 23B in which the flighting is carried is moved even further to the right side of the wagon (left side as seen in the drawing). In FIG. 2, with the upper auger section in the transport position, a substantial part of the flighting center tube and the upper auger flighting can be seen to be moved out of the outer housing 23B of the upper auger section 23.

In the embodiment illustrated in the drawing, the movement of the delivery hood 32 is approximately 17 inches between the delivery and transport positions. This amount of travel, while conforming to standards of the maximum width of the wagon for road travel and permitting the wagon to travel through gates of conventional width, nevertheless extends the effective length of the auger by 17 inches in the delivery position. It will be appreciated that the transport vehicle receiving grain from the auger is typically moving next to the combination of tractor/auger wagon so that the further to the side that the depositing of the grain takes place, the safer it is for both the tractor and tractor driver, and the transport vehicle and its operator.

A tapered alignment pin 50 is positioned on the axis of the flighting tube of the fixed lower auger section 22, above the upper bearing for the lower auger. In the lower end of the upper auger flighting tube 25 is a correspondingly tapered alignment socket 51 (FIG. 2) for receiving the alignment pin 50 of the lower auger section. When the two auger flightings are assembled, a drive lug 53 (FIG. 2) of the lower auger flighting (which is driven via separate gear box 52 in FIG. 1 from the tractor PTO 19) couples in driving engagement with the upper auger flighting 24 in a known manner.

As the upper auger section rotates to the delivery position, the two-tapered alignment elements 50, 51 engage. This transfers the support of the upper bearing in the lower auger assembly to the lower end of the upper auger flighting. This centers the upper auger flighting in the upper auger housing 23B, and axially aligns the two augers for use. If the two alignment components cannot easily engage because of the position they are in at that moment, a slidable upper bearing allows linear axial movement of the auger flighting in the upper auger so it may move away from any obstruction and then drop into engagement with the lower auger flighting once the upper auger assembly is fully folded to its use position.

Other embodiments of the invention are contemplated, which could be employed to accomplish the function of gaining maximum discharge height and reach (in the use position) while minimizing the transport width of the cart. For example, a similar moveable hood and auger assembly is contemplated utilizing an hydraulic cylinder or other linear actuator to impart delay, and the axial movement of the hood rather than the mechanical control linkage described. This cylinder could be connected as a slave cylinder to the auger fold cylinder to make the function automatic.

Another embodiment would be a hinge mechanism with a double-jointed movement that would rotate the entire upper auger assembly sidewise over the top of the fixed, lower auger housing until axial alignment is achieved, and then downwardly to couple the two auger flightings.

Having thus disclosed in detail a preferred embodiment of the invention, persons skilled in the art will be able to substitute equivalent elements for those disclosed and modify the structure illustrated while continuing to practice the principles of the invention. It is, therefore, intended that all such substitutions and modifications be covered as they are embraced within the spirit and scope of the claims.

The invention claimed is:

1. An agricultural auger wagon comprising:
a grain storage bin supported by wheels;
a lift auger for lifting grain from said grain storage bin to an elevated position for delivery, said lift auger including:
a lower auger section fixed to and extending through said grain storage bin to a higher elevation in front of and to a side of said grain storage bin;
an upper auger section adapted to be received on said lower auger section;
a powered linkage for moving said upper auger section between a delivery position in which said upper auger section is aligned axially with said lower auger section and receives grain from said lower auger section and a transport position in which said upper auger section extends generally horizontally and transverse of the direction of travel of said auger wagon, wherein said upper auger section includes an auger housing, auger flighting and a delivery hood which extend substantially within lateral sides of said grain storage bin in the transport position, and wherein said auger flighting is mounted to said delivery hood, whereby said delivery hood and auger flighting of said upper auger section are moved telescopically of said upper auger housing when said upper auger section is moved between said delivery and transport positions.

2. The auger wagon of claim 1 wherein said delivery hood is mounted externally of said upper auger section.

3. The auger wagon of claim 2 further comprising a lock collar mounting said auger flighting of said upper auger section to said delivery hood.

4. The auger wagon of claim 1 wherein said lower and upper auger sections include auger flighting and the auger flighting of said upper and lower auger sections are coupled together in the delivery position by a tapered cone in one of said auger flightings and a tapered receptacle in the other auger flighting.

5. In an agricultural auger wagon, including a lift auger extending upwardly, and to the front and a side of said wagon; said lift auger including an auger section adapted to be moved between a raised delivery position and a lowered transport position, said auger section including a cylindrical auger housing, and auger flighting disposed in said auger housing; and
a delivery hood coupled to said auger flighting and slidably mounted to said auger housing whereby when said auger section is moved to the lowered transport position, said delivery hood is moved telescopically of said auger housing and said auger flighting is moved telescopically within said auger housing.

6. An auger wagon comprising:
a storage bin supported on wheels;
a floor auger for moving grain in said storage bin to a transfer location;
a delivery auger having a lower auger section fixed to said storage bin and extending upwardly, forwardly and to a side of said storage bin, and an upper auger section including an auger housing, auger flighting and a delivery hood coupled to and axially aligned with said lower auger section in a delivery mode, and wherein a lower end portion of said lower auger section is disposed within said storage bin and is coupled to said floor auger; and
a powered linkage connected to said upper auger section to move said upper auger section when actuated, away from said lower auger section to uncouple said upper auger section from said lower auger section, and rotate said upper auger section to a transport position in front of said storage bin and characterized in that said upper auger section lies substantially within the side edges of said storage bin in the transport position and said delivery hood and auger flighting of said upper auger section are moved telescopically of said upper auger housing when said upper auger section is moved between a delivery position and said transport position.

7. The auger wagon of claim 4 wherein said upper auger section extends in a horizontal position transverse of the direction of travel in the transport position.

8. In a mobile auger wagon, the combination comprising:
a bin for storing grain;
a floor auger for moving grain in said mobile auger wagon to a desired location;
a second auger receiving grain from said floor auger and including a lower auger section having auger flighting and an upper auger section having auger flighting and arranged to couple with said lower auger section in a delivery mode;

a discharge hood slidably received on the outer surface of an exterior auger tube of said upper auger section and moveable between a delivery position and a transport position, said hood connected to said auger flighting of said upper auger section;

a powered linkage for moving said upper auger section between the delivery position and the transport position;

and control linkage pivotally connected at one end to a location adjacent the coupling area of said lower and upper auger sections in the delivery position, and connected to said delivery hood at a second end, whereby as said powered linkage rotates said upper auger section to the transport position, said control linkage moves said discharge hood and said auger flighting of said upper auger section telescopically of said upper auger section.

9. The auger wagon of claim 7 further comprising a lock collar mounting said auger flighting of said upper auger section to said delivery hood.

* * * * *